T. A. BRYSON.
CLOSURE FOR CENTRIFUGAL MACHINES.
APPLICATION FILED NOV. 25, 1914.

1,160,373.

Patented Nov. 16, 1915.
2 SHEETS—SHEET 1.

WITNESSES

INVENTOR
T. A. Bryson
BY
John D. Morgan
ATTORNEY

T. A. BRYSON.
CLOSURE FOR CENTRIFUGAL MACHINES.
APPLICATION FILED NOV. 25, 1914.
Patented Nov. 16, 1915.
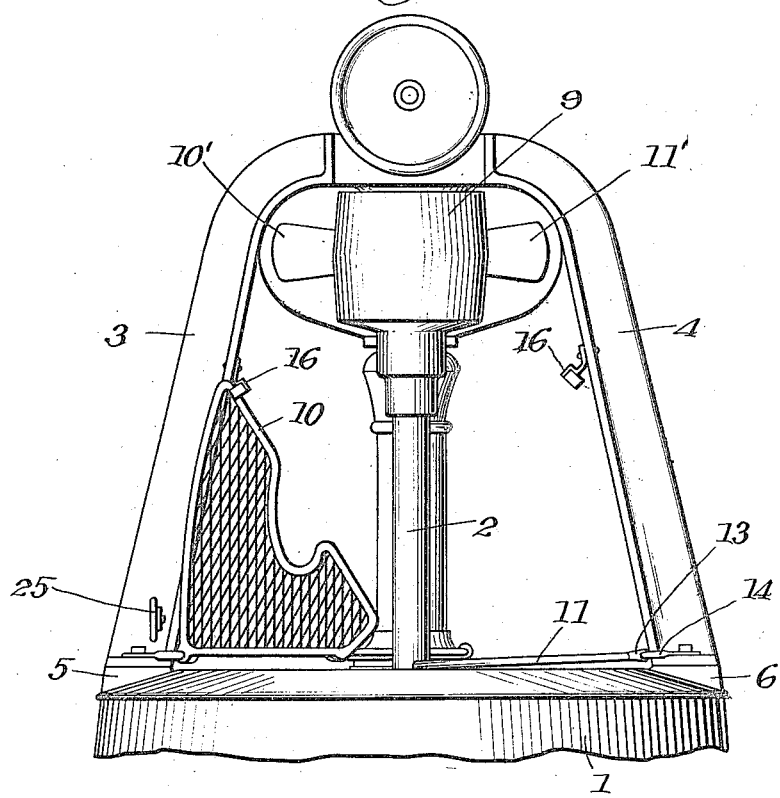
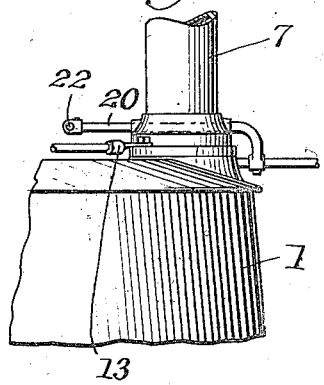

UNITED STATES PATENT OFFICE.

TANDY A. BRYSON, OF TROY, NEW YORK, ASSIGNOR TO TOLHURST MACHINE WORKS, A CORPORATION OF NEW YORK.

CLOSURE FOR CENTRIFUGAL MACHINES.

1,160,373.

Specification of Letters Patent. Patented Nov. 16, 1915.

Application filed November 25, 1914. Serial No. 873,985.

*To all whom it may concern:*

Be it known that I, TANDY A. BRYSON, a citizen of the United States, and a resident of Troy, New York, have invented new and useful Improvements in Closures for Centrifugal Machines, of which the following is a specification.

The invention relates to hydro-extractors or centrifugal drying machines, and more especially to closures for such machines.

Objects and advantages of the invention will in part be set forth hereinafter, and in part will be obvious herefrom, the same being attained through the means, instrumentalities, and combinations pointed out in the appended claims.

The invention consists in the novel parts, constructions, arrangements, combinations and improvements herein shown and described.

The accompanying drawings referred to herein, and constituting a part hereof, illustrate one embodiment of the invention, and together with the description serve to explain the principles thereof.

Figure 1:
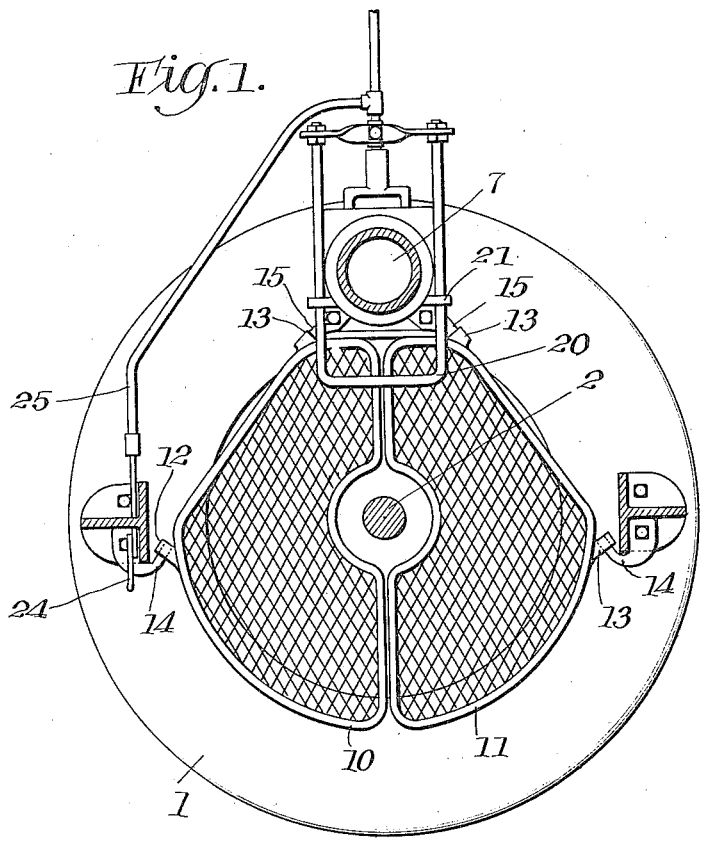
Figure 2:
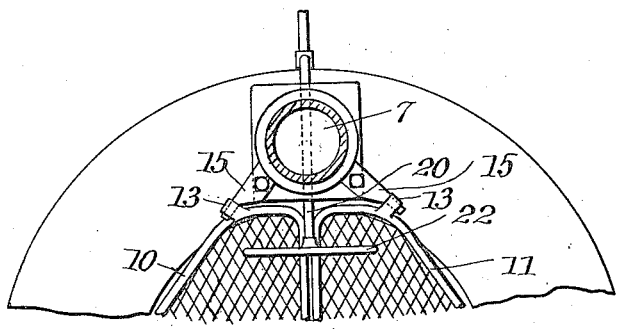

Of the drawings: Figure 1 is a top plan, the upper part of the basket driving shaft, its supports and associated parts being cut away in section, and showing the closure in closed position; Fig. 2 is a fragmentary plan corresponding to the upper part of Fig. 1 and showing certain parts of somewhat different form; Fig. 3 is an elevation looking at Fig. 1 from the foot of the sheet, showing the upper part of the structure (which is cut off in Fig. 1) and showing one-half or side of the closure in raised position, the other half being in the down or closed position; and Fig. 4 is a fragmentary elevation corresponding to Fig. 2.

In machines of this kind, there is usually provided a stationary or outer inclosing casing of circular form, and within the casing is the rotating basket or cylindrical member in which the articles or materials to be dried are placed and within which they are subjected to the centrifugal action, said stationary outer casing being indicated by the numeral 1. Above said casing 1 is arranged the supporting means for the basket driving or rotating shaft, and for the pulleys or other driving means for the shaft. As embodied, a shaft 2 extends upwardly from the basket (not shown) but which is inclosed and rotated within the outer casing 1 in a well-known manner. The shaft at its upper end is carried in bearings which are supported by a yoke or standards 3 and 4, fixed to suitable supporting surfaces 5 and 6, respectively, upon the upper part of the container 1, and substantially diametrically opposite each other. The standards or yoke members 3 or 4 are inclined and curved inwardly, and at their center meet a forward projection from a column or standard 7 supported on the rear portion of the container 1, and substantially mid-way circumferentially between the standards 3 and 4. The shaft 2 is driven by means of a pulley 9 over which passes a belt, the belt extending backwardly through guides 10' and 11' to a suitable drive.

It is very desirable to provide a closure for the top of the stationary container 1 while the basket within is being swiftly rotated during the drying or water extracting operation. By my invention, I provide such a closure which is exceedingly simple in construction and likewise simple in its operation, and which has few parts, and by a simple opening movement passes and remains out of the way giving full access and headroom over the basket to facilitate loading and unloading. In the embodied form, the closure comprises two members or halves 10 and 11, which are substantially plane and fit down flat over the top opening in the closure 1. The two halves or members 10 and 11 have this line of juncture substantially along the central line of the machine from front to rear, the front being at the bottom in Fig. 1. The two halves are recessed to afford space for the shaft 2 of the rotating basket.

Each of the halves 10 and 11 are provided with a hinge or hinges which are arranged to the rear and at an angle to the center line from front to back of the machine. Each half, as embodied, has lugs 12 and 13 which turn on pintles or bearings 14 and 15, respectively. The hinge line or pivot line for each of the members or halves 10 and 11 extends angularly from a point relatively close to the center or dividing line of said halves at the rear to a point close or approximate to the widest point of the container, that is, approximately on or near the intermediate or transverse diameter, considered from the front to the rear of the machine, as will clearly appear from Fig. 1 of the drawings. Thus as each half of the closure is swung 10 upwardly it also swings rearwardly, in a direction perpendicular to the hinge or pivot line, as will be clearly understood. The closures on either side swing upwardly against the standards 3 and 4 respectively, and are there held by latches 16, which are fixed to these standards. In Fig. 3 of the drawings the lid or closure 10 is shown in the open and latched position, while the lid member 11 is shown in the closed position. It will be seen therefore that the closure is of great simplicity in structure and in operation, and that it opens up to an out of the way position by a single hinging or swinging movement in one direction only, leaving the entire front and overhead above the opening in basket 1 unobstructed, and as free space for utilization in loading and unloading the basket.

Means are shown whereby the belt shipper and the closure coöperate together so that the belt may not be thrown on while the lid or closure is open and vice versa. For this purpose the lid or closure in its open position is interposed into the path of the belt shipper in moving from the inoperative to the operative position, and vice versa. In the embodied form of this feature or arrangement, the belt shipper is provided with forwardly projecting rods 20, slidably carried in bearings 21. In Fig. 2 of the drawing a single rod is shown with a cross piece 22 extending transversely, so that either of the members 10 and 11 when open will prevent the belt being thrown on. In Fig. 1 of the drawings the lids are shown closed and the belt shipper in the driving or operative position. A suitable handle 24 and operating rod 25 for the belt shipper are arranged in convenient position to be operated from the front of the machine.

From all the foregoing it will be understood that a machine has been provided realizing the objects and advantages herein set forth, together with other objects and advantages which will be clear to those skilled in the art.

The invention in certain aspects is not limited to the precise form shown and described, but changes may be made therein without departing from the principles of the invention and without sacrificing its chief advantages.

What I claim as my invention and desire to secure by Letters Patent is:—

1. The combination with the container of a centrifugal machine of a two part closure for the open top of the container, said parts having their line of juncture centrally of the container from front to rear, and a hinge for each of the closure parts, said hinges being diagonally positioned and inclined toward the center of the machine at their rear ends and toward the sides of the container at their forward ends.

2. The combination with the container of a centrifugal machine of a two part closure for the open top of the container, said parts having their line of juncture centrally of the container from front to rear, and a hinge for each of the closure parts, said hinges being located to the rearward above the container and diagonally positioned and inclined toward the center of the machine at their rear ends and toward the sides of the container at their forward ends.

3. A centrifugal drying machine including in combination a container for the rotating basket, standards mounted substantially diametrically apart at the sides of said container, a supporting column centrally at the rear of said container, a two part closure for the container with the juncture between the parts located centrally of the machine from front to rear, and having hinges located to the rear and positioned diagonally from near the rear column outwardly toward the side standards.

4. A centrifugal drying machine including in combination a container for the rotating basket, standards mounted substantially diametrically apart at the sides of said container, a supporting column centrally at the rear of said container, a two part closure for the container with the juncture between the parts located centrally of the machine from front to rear, and having hinges located to the rear and positioned diagonally from near the rear column outwardly toward the side standards and latches on the side standards for holding the respective parts of the closure.

5. A centrifugal drying machine including in combination a container for the rotating basket, standards mounted substantially diametrically apart at the sides of said container, a supporting column centrally at the rear of said container, a two part closure for the container with the juncture between the parts located centrally of the machine from front to rear, and having hinges located to the rear and positioned diagonally from near the rear column outwardly toward the side standards, and a belt shifting device which is prevented from being moved to the operative position when the closure is in open position.

6. A centrifugal drying machine including in combination a container for the rotating basket, standards mounted substantially diametrically apart at the sides of said container, a supporting column centrally at the rear of said container, a two part closure for the container with the juncture between the parts located centrally of the machine from front to rear, and having hinges located to the rear and positioned diagonally from near the rear column outwardly toward the side standards and latches on the side standards for holding the respective parts of the closure and a belt shifting device which is prevented from being moved to the operative position when the closure is in open position.

7. A centrifugal drying machine including in combination a container for the rotating basket, standards mounted substantially diametrically apart at the sides of said container, a supporting column centrally at the rear of said container, a two part closure for the container with the juncture between the parts located centrally of the machine from front to rear, and having hinges located to the rear, and positioned diagonally from near the rear column outwardly toward the side standards and a belt shifting device which is prevented from being moved to the operative position when either part of the closure is in open position.

8. A centrifugal drying machine including in combination a container for the rotating basket, standards mounted substantially diametrically apart at the sides of said container, a supporting column centrally at the rear of said container, a two part closure for the container with the juncture between the parts located centrally of the machine from front to rear, and having hinges located to the rear and positioned diagonally from near the rear column outwardly toward the side standards and latches on the side standards for holding the respective parts of the closure and a belt shifting device which is prevented from being moved to the operative position when either part of the closure is in open position.

In testimony whereof, I have signed my name to this specification, in the presence of two subscribing witnesses.

TANDY A. BRYSON.

Witnesses:
DAVID C. PATTON,
ARTHUR J. CADY.